(12) United States Patent
Moussaif et al.

(10) Patent No.: US 10,611,683 B2
(45) Date of Patent: Apr. 7, 2020

(54) POLYPROPYLENE FIBERS, METHODS FOR PRODUCING THE SAME AND USES THEREOF FOR THE PRODUCTION OF FIBER CEMENT PRODUCTS

(71) Applicant: Etex Services NV, Kapelle-op-den-Bos (BE)

(72) Inventors: Noureddin Moussaif, Kapelle-op-den-Bos (BE); Benoit de Lhoneux, Namur (BE)

(73) Assignee: Etex Services NV, Kapelle-op-den-Bos (BE)

( * ) Notice: Subject to any disclaimer, the term of this patent is extended or adjusted under 35 U.S.C. 154(b) by 131 days.

(21) Appl. No.: 15/531,171

(22) PCT Filed: Dec. 8, 2015

(86) PCT No.: PCT/EP2015/078911
§ 371 (c)(1),
(2) Date: May 26, 2017

(87) PCT Pub. No.: WO2016/096523
PCT Pub. Date: Jun. 23, 2016

(65) Prior Publication Data
US 2018/0022644 A1 Jan. 25, 2018

(30) Foreign Application Priority Data
Dec. 17, 2014 (EP) .................................. 14198561

(51) Int. Cl.
| | | |
|---|---|---|
| *C04B 28/02* | (2006.01) | |
| *C04B 16/06* | (2006.01) | |
| *C04B 40/00* | (2006.01) | |
| *D01D 5/088* | (2006.01) | |
| *D01D 5/12* | (2006.01) | |
| *D01F 6/06* | (2006.01) | |

(52) U.S. Cl.
CPC .......... *C04B 16/0633* (2013.01); *C04B 28/02* (2013.01); *D01D 5/088* (2013.01); *D01D 5/0885* (2013.01); *D01D 5/12* (2013.01); *D01F 6/06* (2013.01)

(58) Field of Classification Search
CPC ... C04B 16/0633; D01D 5/088; D01D 5/0885
USPC ............................ 264/178 F; 524/8; 106/724
See application file for complete search history.

(56) References Cited

U.S. PATENT DOCUMENTS

| | | | | |
|---|---|---|---|---|
| 3,059,991 A | * | 10/1962 | Munt ....................... | A46D 1/00 15/207.2 |
| 5,338,357 A | * | 8/1994 | Takai ..................... | C04B 16/06 106/686 |
| 2006/0280924 A1 | | 12/2006 | Morin | |
| 2013/0302608 A1 | | 11/2013 | Morin | |

* cited by examiner

*Primary Examiner* — Fred M Teskin
(74) *Attorney, Agent, or Firm* — Dilworth & Barrese, LLP

(57) ABSTRACT

The present invention relates to improved polypropylene fibers and methods for producing the same as well as uses of such polypropylene fibers for the production of fiber cement products. The present invention further relates to fiber cement products, such as flat or corrugated fiber cement sheets, comprising the polypropylene fibers of the present invention. The fiber cement products of the present invention have an improved impact resistance as compared to fiber cement products not containing the polypropylene fibers of the present invention.

21 Claims, 1 Drawing Sheet

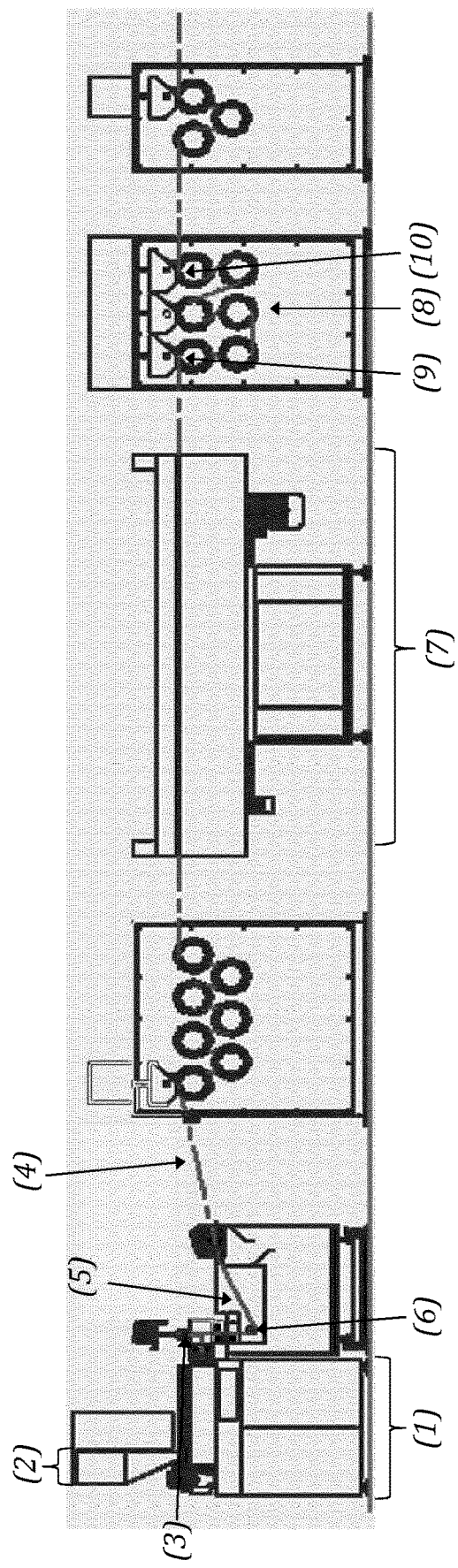

POLYPROPYLENE FIBERS, METHODS FOR PRODUCING THE SAME AND USES THEREOF FOR THE PRODUCTION OF FIBER CEMENT PRODUCTS

FIELD OF THE INVENTION

The present invention relates to improved polypropylene fibers and methods for producing the same as well as uses of such polypropylene fibers for the production of fiber cement products.

BACKGROUND OF THE INVENTION

Polypropylene is a thermoplastic resin obtained by polymerizing propylene. Polypropylene fibers are produced by a well known melt spinning process, in which molten polymer is pumped through a die having a large number of small openings to produce a tow of continuous filaments. The filaments are cooled and drawn or elongated to increase tensile strength. A size or finish is usually applied to the filaments, followed by drying and tempering if required and optionally chopping into the desired length to provide bundles of fibers.

Since polypropylene has excellent characteristics such as a low density, a high strength, and an excellent resistance to heat and chemicals, polypropylene fibers are used in a wide variety of applications, such as textiles, packaging materials, containers, automobile components, etc.

European patent EP1812628 as well as equivalent US application US2013/0302608 disclose a process for producing melt-spun polypropylene multifilaments and yarns formed therefrom. The process involves forming melted polymeric composition requiring as an essential feature the presence of a nucleating agent, extrusion of the formed melted polymeric composition, quenching of the formed filaments in a liquid bath at a temperature of between 50° C. and 130° C. and drawing the filaments while heating at a temperature of between about 120° C. and about 150° C., wherein both the presence of the nucleating agent and the sufficiently long dwell time of the filament in the liquid bath ensure a sufficient degree of crystallization of the filament. The disclosed fibers are indeed highly crystalline, exhibiting more than about 80% crystallinity as measured using WAXS and SAXS techniques. It is further disclosed in EP1812628 (as well as in US2013/0302608) that these polypropylene fibers produced by this process can be utilized for forming ropes and woven or non-woven fabrics. While highly crystalline polypropylene fibers indeed may have their benefits in certain applications, such as for example for the production of textiles, a high crystallinity is in fact not an advantageous property for the production of fiber reinforced cement products. Indeed, it is known that polypropylene fibers having a high degree of crystallinity, typically exhibit a relatively low tenacity (i.e. a low fiber strength). For reinforcement of fiber cement products, however, the tenacity of the incorporated fibers is the main and essential property that contributes to the mechanical strength of the fiber cement end product. Therefore, the highly crystalline filaments and fibers as disclosed in EP1812628 (and equivalent US2013/0302608) are not suitable for the production of fiber reinforced cement products, especially given the fact that in every country all over the world these products are subject to strict national rules and regulations, stating the minimum requirements for mechanical strength of such products in order to ensure both safety for construction workers as well as performant products for the end users.

Despite the fact that several further variants to the production methods disclosed in EP1812628 have been developed, the polypropylene fibers produced by these known processes show an insufficient performance to be suitable for applications where a very high fiber strength is demanded, such as in fiber cement applications. Furthermore, while different research groups have tried to develop alternative methods to the known industrial process(es) in order to obtain polypropylene fibers with at least a higher fiber strength, such methods proved not to be feasible at industrial scale. Indeed, up-scaling from laboratory to industrial scale presents different challenges with regard to both technical and economical feasibility. Also, certain lab scale methods lead to inconsistent and varying filament or fiber qualities when performed even only at semi-industrial scale.

SUMMARY OF THE INVENTION

Therefore, an object of the present invention is to provide methods, in particular industrial methods, for producing polypropylene fibers with improved properties, which are suitable for use in the production of fiber cement products (i.e. fiber reinforced cement products), more particularly for use in the production of flat or corrugated fiber cement sheets.

In this respect, the present inventors have developed a novel industrial process for the production of polypropylene mono- or multifilaments and fibers derived therefrom, having improved characteristics with respect to fiber density and strength. Contrary to the processes formerly described in the prior art, the processes of the present invention do not require the presence or addition of a nucleating agent.

Moreover, contrary to the prior art processes, the processes of the present invention for the first time allow the high throughput production of mono- or multifilaments and fibers derived therefrom with improved mechanical properties, on an industrial production scale.

In particular, certain parameters during the extrusion process were found to be crucial to obtain polypropylene filaments and fibers, which are particularly suitable for the reinforcement of cementitious products and thus for the production of fiber reinforced cement products.

In particular, it has been found that by quenching the polypropylene fibers in a specific manner during the production process, filaments and fibers particularly suitable for use in fiber cement materials are obtained.

More particularly, the methods according to the present invention comprise the step of quenching an extruded polypropylene filament in a liquid bath having a temperature of between about 5° C. and about 50° C., wherein the distance between the surface of said liquid bath and the extruder spinneret is in a range between about 5 mm and about 200 mm.

In particular embodiments, the processes of the present invention comprise the step of quenching an extruded polypropylene filament in a liquid bath having a temperature of between about 30° C. and about 50° C., such as preferably between about 35° C. and 45° C. In further particular embodiments, the processes of the present invention comprise the step of quenching an extruded polypropylene filament in a liquid bath wherein the distance between the surface of said liquid bath and the extruder spinneret is in a range between about 5 mm and about 15 mm.

In certain embodiments, the resident time of the extruded filament in the liquid bath is between about 1 second and 30 seconds, preferably less than 10 seconds, preferably between about 1 and about 10 seconds, more preferably between about 1 and 5 seconds.

Without being bound to a particular theory or hypothesis, the inventors believe that, in the processes of the invention, the temperature of the liquid bath, the resident time of the extruded filament in the liquid bath and the distance between the surface of said liquid bath and the extruder spinneret are three parameters which beneficially contribute to the overall performance of the produced filaments and fibers in a fiber cement end product.

In fact, the inventors have found that by quenching an extruded polypropylene filament for a limited resident time in a liquid bath having a temperature of between about 5° C. and about 50° C., wherein the distance between the surface of said liquid bath and the extruder spinneret is in a range between about 5 mm and about 200 mm, a filament with a relatively low to medium crystallinity and with a very good fiber strength is obtained. More particularly, the mono- and multifilaments or fibers as obtained according to the processes of the invention have a relatively low to medium degree of crystallinity of between about 40% and about 60% (as measured using SAXS and DSC measurement techniques) and have a tenacity of at least 7 cN/dtex, such as between about 7 cN/dtex and about 20 cN/dtex.

In addition, the present inventors have found that the process is preferably performed in the absence of a nucleating agent. Indeed, nucleating agents typically induce a high degree of crystallization of the resulting filaments and fibers, which is not desirable for the filaments and fibers of the present invention.

Thus, in particular embodiments, the processes according to the present invention are performed in the absence of a nucleating agent.

Using the production process of the present invention, the present inventors have succeeded in producing polypropylene monofilaments, multifilaments and fibers derived therefrom, which are characterized by a linear density ranging from about 1 to about 75 dtex per filament (dpf) and a fiber strength or tenacity ranging from about 7 cN/dtex to about 15 cN/dtex or more, such as between about 8 cN/dtex to about 20 cN/dtex or more.

Moreover and importantly, it was found that when using the fibers obtainable by the methods according to the present invention as raw material in the production of fiber cement, fiber cement products with a significantly improved impact resistance (i.e. Charpy impact resistance) were obtained.

In a first aspect, the present invention provides processes for the production of a drawn polypropylene filament (i.e. monofilament or multifilament) or fiber (or fibers) derived therefrom for the reinforcement of cementitious products, comprising the steps of:
(i) forming a melted polypropylene composition comprising at least one polypropylene,
(ii) extruding the melted polymeric composition through a spinneret to form a filament of the polymeric composition,
(iii) quenching the extruded polypropylene filament in a liquid bath having a temperature of between about 5° C. and about 50° C., wherein the distance between the surface of said liquid bath and the surface of said spinneret ranges between about 5 mm and about 200 mm, and
(iv) drawing said filament at a temperature of between about 130° C. and 180° C. to form a drawn polypropylene filament, and optionally (v) cutting said filament into fibers having a length between about 3 and about 50 mm.

In particular embodiments, the processes of the present invention are industrial processes, i.e. processes which can be performed at industrial scale with a high consistency and without affecting the quality and mechanical properties of the produced filaments and fibers.

In further particular embodiments, the processes of the present invention are for the production of drawn polypropylene multifilaments or fibers and comprise the steps of:
(i) forming a melted polypropylene composition comprising at least one polypropylene,
(ii) extruding the melted polymeric composition through a spinneret to form multiple filaments of the polymeric composition,
(iii) quenching the extruded polypropylene filament in a liquid bath having a temperature of between about 5° C. and about 50° C., wherein the distance between the surface of said liquid bath and the surface of said spinneret ranges between about 5 mm and about 200 mm,
(iv) collecting the multiple filaments to form a multifilament,
(v) drawing said multifilament at a temperature of between about 130° C. and 180° C. to form a drawn polypropylene multifilament, and optionally cutting said filament into fibers having a length between about 3 and about 50 mm.

In particular embodiments, the process according to the present invention is performed in the absence of a nucleating agent.

In further particular embodiments of the processes of the present invention, the resident time of the extruded filament in the liquid bath is between about 1 second and 30 seconds, preferably less than 10 seconds, preferably between about 1 and about 10 seconds, more preferably between about 1 and 5 seconds.

In yet further particular embodiments, in the processes according to the present invention, the liquid bath has a temperature between about 30° C. and about 50° C., more particularly between about 35° C. and about 45° C.

In certain particular embodiments, in the processes according to the present invention, the distance between the surface of the liquid bath and the surface of the spinneret ranges between about 5 mm and about 160 mm, such as but not limited to between about 5 mm and about 10 mm.

In certain other particular embodiments, in the processes according to the present invention, the distance between the surface of the liquid bath and the surface of the spinneret ranges between about 5 mm and about 15 mm, such as but not limited to between about 10 mm and about 15 mm.

In certain particular embodiments, in the processes according to the present invention, after having performed step (ii) of extruding and prior to performing step (iii) of quenching, the melted polymeric composition is kept at a temperature ranging between about 150° C. and about 200° C., such as but not limited to a temperature ranging between about 165° C. and about 180° C.

According to a second aspect, the present invention provides drawn polypropylene filaments or drawn polypropylene multifilaments obtainable by the processes as defined herein, wherein the filaments or multifilaments are characterized by a linear density of between about 1 dtex and about 75 dtex per filament (dpf) and a tenacity of between about 7 cN/dtex and about 15 cN/dtex or more.

In particular embodiments, the present invention provides drawn polypropylene monofilaments or drawn polypropylene multifilaments or fibers derived therefrom as obtainable by the processes as defined herein, wherein the monofilaments or multifilaments are characterized by a linear density of between about 1 dtex and about 75 dtex per filament (dpf) and a tenacity of between about 7 cN/dtex and about 20 cN/dtex or more.

In particular embodiments, the present invention provides drawn polypropylene filaments or drawn polypropylene multifilaments obtainable by the processes as defined herein, wherein the filaments or multifilaments are characterized by a linear density of between about 5 dtex per filament and about 25 dtex per filament and a tenacity of between about 10 and about 15 cN/dtex.

In further particular embodiments, the present invention provides drawn polypropylene monofilaments or drawn polypropylene multifilaments or fibers derived therefrom as obtainable by the processes as defined herein, wherein the monofilaments or multifilaments or fibers are characterized by a linear density of between about 5 dtex per filament and about 25 dtex per filament and a tenacity of between about 8 and about 20 cN/dtex.

In particular embodiments, the present invention provides drawn polypropylene monofilaments or drawn polypropylene multifilaments or fibers derived therefrom as obtainable by the processes as defined herein, wherein the monofilaments or multifilaments or fibers are characterized by a crystallinity between about 40% and about 60% as determined using WAXS and DSC measuring techniques.

In further particular embodiments, the present invention provides drawn polypropylene monofilaments or drawn polypropylene multifilaments or fibers derived therefrom as obtainable by the processes as defined herein, wherein the monofilaments or multifilaments or fibers are characterized by a crystallinity between about 45% and about 50% as determined using WAXS and DSC measuring techniques.

In further particular embodiments, the present invention provides drawn polypropylene filaments or drawn polypropylene multifilaments obtainable by the processes as defined herein, wherein the filaments or multifilaments are characterized by having an elongation at breakage of between about 5% and 40%, such as but not limited to an elongation at breakage of between about 10% and about 25%.

In a third aspect, the present invention provides uses of the drawn polypropylene filaments or drawn polypropylene multifilaments, obtainable by the processes as defined herein, for the production of a fiber cement product.

In a fourth aspect, the present invention provides processes for the production of fiber cement products, which processes at least comprise the step of manufacturing a fiber cement product starting from fiber material derived from drawn polypropylene filaments obtainable by the processes as defined herein.

In a fifth aspect, the present invention provides fiber cement products obtainable by the processes for the production of fiber cement products as defined herein, which at least comprise the step of manufacturing a fiber cement product starting from fiber material derived from drawn polypropylene filaments obtainable by the processes as defined herein.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference FIGURES quoted below refer to the attached drawings.

BRIEF DESCRIPTION OF THE DRAWINGS

FIG. 1 is a schematic view of a monofilament extrusion line.
(1) Extruder apparatus
(2) Inlet
(3) Spinneret
(4) Filament
(5) Liquid bath
(6) Roll
(7) Oven
(8) Draw roll(s)
(9) First draw roll
(10) Last draw roll

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The term "cementitious" as in "cementitious product" or "cementitious material" as used herein refers to any product or material comprising cement, such as but not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The term "fiber cement product" as used herein refers to products at least comprising fibers and cement. The fiber cement products as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

The term "fiber reinforced cement product" as used herein refers to products at least comprising reinforcing fibers and cement. The fiber reinforced cement products as used in the context of the present invention may also further comprise non-reinforcing fibers (also referred to as "process fibers") as well as other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

The term "filament" as used herein refers to an endless polypropylene fiber.

The term "monofilament" as used herein refers to a filament that has been extruded or spun from a melt as an individual filament. That is, while the extruded filament can be subjected to post-extrusion processing (e.g., quenching, drying, drawing, heat processing, finishing, etc.), the filament are initially extruded or spun from a melt in its individual form.

The term "multifilament" as used herein refers to a multiplicity of filaments that have been extruded or spun from a melt as multiple filaments. That is, while the extruded multiplicity of filaments can be subjected to post-extrusion processing (e.g., quenching, drying, drawing, heat processing, finishing, etc.), the multiple filaments are initially extruded or spun from a melt simultaneously, i.e. in their multiple form.

The term "fiber" or "staple fiber" as used in the context of the present invention refers to filaments, which have been cut, broken or torn to a certain length, i.e. the staple length.

The term "(staple) length of fiber(s)" as used herein refers to the average length of a group of (staple) fibers of any composition. For cut synthetic fibers, such as polypropylene fibers, the (staple) length refers to the discrete length to which these fibers have been cut, and is thus the same for every fiber present in the group. For broken or torn synthetic fibers, such as polypropylene fibers, the (staple) length refers to the average length to which these fibers have been broken or torn.

In the context of the present invention, the term "polypropylene" is intended to include any polymeric composition comprising propylene monomers, either as a homopolymer or copolymer with other polyolefins, dienes, or other monomers (such as ethylene, butylene, and the like). The term is also intended to encompass any different configuration and arrangement of the constituent monomers (such as syndiotactic, isotactic, and the like). Thus, the term as applied to filaments, monofilaments, multifilaments or fibers herein, is intended to encompass endless stretches, actual long strands, threads, and the like, of polypropylene homopolymer or copolymer.

The term "nucleating agent" as used herein can generally be any material that can provide nucleation sites allowing the formation of polypropylene crystals during the transition of the polypropylene from the molten state to the solid structure. Generally, "a nucleating agent" as used herein thus refers to an agent that facilitates or increases the rate of crystallization of polypropylene during during the transition of the polypropylene from the molten state to the solid structure. A non-limiting list of exemplary nucleating agents can include, for example, dibenzylidene sorbitol nucleating agents, as are generally known in the art, such as dibenzylidene sorbitol (DBS), monomethyldibenzylidene sorbitols such as 1,3:2,4-bis(p-methylbenzylidene) sorbitol (p-MDBS), dimethyl dibenzylidene sorbitols such as 1,3:2, 4-bis(3,4-dimethylbenzylidene) sorbitol (3,4-DMDBS), and the like. Other suitable nucleating agents can include sodium benzoate, phosphate ester salts, such as NA-11 and NA-21, developed by Asahi Denka of Japan, or the hyper nucleating agents developed by Milliken Chemical of South Carolina such as, for example, Hyperform® HPN-68L.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

In a first aspect, the present invention provides processes for the production of polypropylene filaments. In particular, the process of the present invention allows to produce a specific type of polypropylene filaments having a unique combination of advantageous characteristics, including a high fiber density, a high fiber strength and a high fiber elongation percentage.

The present inventors have found that filaments or fibers obtainable by the processes of the invention and/or having the combination of specific characteristics as further described herein, are particularly suitable for use in the production of fiber cement products, and thus for the reinforcement of cementitious products, such as but not limited to flat or corrugated fiber cement sheets.

Referring to FIG. 1, one embodiment of the presently disclosed process is schematically illustrated. According to the illustrated embodiment, a polypropylene-based melt can be provided to an extruder apparatus (1). Indeed, the first step in the processes according to the present comprises forming a melted polypropylene composition comprising at least one polypropylene. Subsequently, in a second step, the melted polymeric composition is extruded through a spinneret to form a monofilament or a multifilament of the polymeric composition.

Generally, any polypropylene suitable for forming drawn filaments or fibers can be utilized in the process of the invention.

For instance, polypropylene suitable for the present invention can generally be of any standard melt flow. For example, in one embodiment, standard extrusion grade polypropylene resin possessing ranges of melt flow rates (MFR; as measured according to standard ISO 1133) between about 0.5 and about 30 can be utilized in forming the filaments and fibers of the invention. In certain particular embodiments, polypropylene possessing an MFR between about 0.5 and about 25 can be utilized. In certain more particular embodiments, the polypropylene utilized in forming the drawn filaments or fibers can have an MFR between about 0.5 and about 26, including between about 0.5 and about 8, such as between about 0.5 and about 7, such as in particular between about 0.5 and about 6. In further particular embodiments, the polypropylene utilized in forming the drawn filaments or fibers can have an MFR between about 0.5 and 2.8, such as between about 0.5 and 2.0.

In particular embodiments of the invention, the polypropylene material used for forming drawn filaments or fibers in the process of the invention is high molecular weight polypropylene. Thus, in particular embodiments, the polypropylene material used in the process of the present invention has a molecular weight of about 200.000 g/moles or more, such as for instance about 250.000 g/moles or more, particularly about 300.000 g/moles or more, such as more particularly about 350.000 g/moles or more, such as about 400.000 g/moles, at least about 500.000 g/moles or at least about 600.000 g/moles, such as a molecular weight of at least about 700.000 g/moles.

In particular embodiments of the processes of the present invention, the inventors have found that when using polypropylene starting material, which has an average molecular weight of between about 180.000 g/mole and 190.000 g/mole and a molecular weight poly-dispersity index of about 2.6, the speed of the entire polypropylene filament production process can be increased with about 30%, while the process remains highly stable.

The individual components of a polymeric composition for forming the drawn filaments or fibers can be provided to the extruder either separately or together, such as for instance through an inlet (2). For example, individual components such as one or more polypropylene resins can be provided to the extruder (1) either separately or together in powder or pellet form.

In certain particular embodiments, one or more polypropylene resins can be provided in pellet form and fed to the extruder (1) at inlet (2).

The mixture including the polypropylene resin can also include various other additives, which are generally known in the art.

For example, in certain embodiments, when the filaments are desired to have a certain color, the mixture can include suitable coloring agents, such as dyes or other pigments, which are added to the mixture via a so-called master-batch. Other additives that can be combined with the mixture can include, for example, one or more of anti-static agents, antioxidant agents, antimicrobial agents, adhesion agents, stabilizers, plasticizers, brightening compounds, clarifying agents, ultraviolet light stabilizing agents, surface active agents, odor enhancing or preventative agents, light scattering agents, halogen scavengers, and the like. In addition, additives can be included in the melt via a master-batch, or in some embodiments, can be applied as a surface treatment to either the undrawn fiber or optionally to the drawn fiber, as generally known in the art.

In particular embodiments of the processes according to the invention, the polypropylene filaments or fibers of the invention can be formed of a blend of polyolefins, one of which is polypropylene. For example, the polyolefin can be combined in the extruder apparatus with a second polymer. The second polymer can be a different polypropylene or another polyolefin. In certain further embodiments, the polymeric component of the filaments or fibers is a polypropylene/polyethylene blend. In other particular embodiments, other polymers can be blended with the polypropylene. For instance, in one particular embodiment, the polypropylene filaments or fibers of the invention can be formed of a polypropylene/cyclic polyolefin blend.

In particular embodiments of the processes of the invention, the extruder apparatus (1) can be a melt spinning apparatus as is generally known in the art. For example, polypropylene resin, optionally one or more additional polyolefins and any other desired additives can be placed in a feed hopper which feeds the resin into the system.

Subsequently, the resin granules are pushed into a barrel by a turning screw while heaters increase the temperature gradually. Towards the end of the turning screw, a melted polymer is obtained. The formation of the molten mixture can generally be carried out at a temperature so as to ensure melting of essentially all of the polypropylene, such as for example at a temperature of between about 175° C. and about 325° C.

Following formation of the molten polymer mixture, it can be conveyed under pressure to the spinneret (3) of the extruder apparatus (1), where it can be extruded through an orifice, opening or pore to form a polypropylene filament (4). As discussed above, the mixture can be extruded as either a monofilament or as a multifilament, for instance in either a sheet orientation or in a cylindrical orientation, and cut, sliced or stretch-broken into individual fibers during post-processing of the monofilament or multifilament. The spinneret (3) can generally be heated to a temperature that allows for extrusion of the molten polymer while preventing breakage of the filament (4) during formation. In certain specific embodiments, the spinneret (3) can be heated to the same temperature as that at which the molten polymer is being formed, e.g. to a temperature of between about 175° C. and about 325° C. In further particular embodiments, the spinneret (3) can be heated during the extrusion process to a temperature between about 220° C. and about 300° C. However, in alternative embodiments, the spinneret (3) can be at a different temperature, such as for example at a lower or higher temperature, than temperature as that at which the molten polymer is being formed.

In further particular embodiments, increasing temperatures can be encountered by the mixture as it progresses from the feed hopper into the turn screw towards the spinneret. In one embodiment, the mixture can progress through several zones prior to extrusion, for example a first zone, in which the temperature can be relatively low, e.g. between about 75° C. and about 150° C., a second zone, in which the temperature can be between about 125° C. and about 275° C., and a third zone at the spinneret, which can optionally include both the spin head and the spin die that can be held at a temperature between about 175° C. and about 325° C., upon which the melt is extruded.

During the process of the present invention, the one or more spinneret orifices, openings or pores through which the polymer can be extruded are generally less than about 1.0 mm in maximum cross-sectional distance (e.g. diameter in the particular case of a circular orifice). For example, in one embodiment, the spinneret orifices can be between about 0.1 mm and about 0.5 mm, such as between about 0.1 mm and about 0.3 mm, including between about 0.1 mm and about 0.25 mm in maximum cross-sectional distance.

According to the present invention, the polymer can be extruded through the spinneret at a relatively high throughput. Excessive shear can be detected in the process by a dramatic decrease in fiber tenacity and modulus with further increase in polymer throughput per hole. The specific excessive shear throughput can generally vary depending upon one or more of the specific exudate material, the spinneret aperture size, as well as the exudate temperature. Excessive shear throughput values for any particular system and materials as well as methods of obtaining such are generally known to those of skill in the art.

In certain specific embodiments and again referring to FIG. 1, following extrusion, the polypropylene filament (4) is quenched in a liquid bath (5) having a temperature of between about 5° C. and about 50° C., such as for example at a temperature of about 45° C., and directed by a roll (6). The liquid bath (5) in which the extruded filament is quenched can be a liquid in which the polymer is insoluble. For example, the liquid can be water, ethylene glycol, or any other suitable liquid as is generally known in the art. In further specific embodiments, during the quenching step, the liquid bath has a temperature between about 30° C. and about 50° C., such as but not limited to between about 35° C. and about 45° C.

In certain specific embodiments of the process according to the invention, the distance between the surface of the liquid bath and the surface of the spinneret ranges between about 5 mm and about 200 mm, such as particularly between about 5 mm and about 160 mm. In further particular embodiments, the distance between the surface of the liquid bath and the surface of the spinneret ranges between about 5 mm and about 100 mm.

In yet further particular embodiments, the distance between the surface of the liquid bath and the surface of the spinneret ranges between about 5 mm and about 10 mm, including but not limited to about 5 to 6 mm.

In certain further embodiments of the process of the present invention, between the step of extrusion and the step of quenching in a liquid bath, the melted polymeric composition is kept at a temperature ranging between about 100° C. and 200° C. Indeed, in certain specific embodiments of the invention, it has been found that it is advantageous in certain specific embodiments of the invention, that the air-exposed part of the filament(s), i.e. after being extruded from the spinneret, is kept in an amorphous state by keeping the temperature at least above about 130° C., and more particularly between about 150° C. and about 200° C., most particularly between about 150° C. and about 180° C., such as between about 165° C. and about 180° C. For instance, the filament (4) can pass through a heated collar prior to entering the liquid bath (5).

One or more rolls (6) can be present within the liquid bath (5) to convey the filament (4) through the bath (5). Resident time of the material in the bath (5) can vary, depending upon particular materials included in the polymeric material, particular line speed, etc.

In particular embodiments, the resident time of the material in the bath (5) can be between about 1 second and about 1 minute, such as more particularly between about 1 second and about 30 seconds, such as most particularly between about 1 second and about 10 seconds. In yet further particular embodiments of the processes of the present invention, the resident time of the material in the bath (5) can be between about 1 second and about 5 seconds, such as more particularly between about 1 second and about 4 seconds, such as most particularly between about 1 second and about 3 seconds. In certain particular embodiments of the invention, the resident time of the material in the bath (5) is about 5 seconds.

At or near the location where the filament (4) exits the bath (5), excess liquid can be removed from the filament (4) according to any process known in the art, such as for instance by using a series of nip rolls, through utilization of a vacuum, a press process utilizing a squeegee, one or more air knives, and the like.

After quenching of the filament (4), any optional process steps can be applied.

In certain particular embodiments, after quenching of the filament (4), optionally the filament is stretched on rolls without applying any heat, i.e. an optional process step which can also be referred to as cold stretching of the filament (4).

In certain other embodiments, the filament can be subjected to additional process steps, such as the addition of a lubricant for example.

After quenching of the filament and optionally other process steps as described above, the filament is drawn while applying heat to a temperature between about 130° C. and 180° C.

In certain particular embodiments, the filament (4) can be drawn in an oven (7) heated to a temperature of between about 130° C. and about 180° C. According to these embodiments, draw rolls (8) can be either interior or exterior to the oven (7), as is generally known in the art.

In alternative embodiments, and as will be clear to the person skilled in the art, rather than utilizing an oven as the heat source, the draw rolls (8) can be heated so as to draw the filament(s) while being heated. For example, the draw rolls can be heated to a temperature of between about 130° C. and about 180° C.

According to yet other embodiments, the filaments can be drawn over a hotplate heated to a similar temperature (i.e. between about 130° C. and about 180° C.).

Thus, it is to be understood that in the context of the present invention, any suitable source of heat can be used to heat the filaments during drawing to a temperature of between about 130° C. and about 180° C.

According to certain specific embodiments of the invention, the filament(s) can be drawn at a draw ratio (defined as the ratio of the speed of the second or final draw roll (10) to the first draw roll (9)) of between about 9 and 15. For instance, in certain further embodiments, the draw ratio of is between about 10 and about 15, such as but not limited to about 10, particularly about 11, more particularly about 12, yet more particularly about 13, such as about 14 or most particularly about 15.

Additionally, the produced filament(s) can be wrapped on coils or cones as is generally known in the art.

It should be understood that any suitable process, other than using draw rolls, that can place a force on the filament (s) so as to elongate it following the quenching step, can optionally be utilized for drawing the filament(s). For example, any mechanical apparatus including nip rolls, godet rolls, coils, cones, steam cans, air, steam, or other gaseous jets can optionally be utilized to draw the filament(s).

Following the drawing step, the drawn filament(s) can be cooled.

In certain embodiments, after cooling down the drawn filament(s), additional optional processing of the drawn filament(s) may be carried out.

For example, in certain embodiments, the drawn filament(s) can be subjected to one or more separate additional drawing steps. In general, these one or more separate drawing steps can be carried out at a similar or higher temperature than the first draw. For instance, the heating elements used in the second, third, fourth etc. drawing step can be heated to a temperature between about 10° C. and about 50° C. higher than the heating element of the first drawing step. In addition, a second, third, fourth etc. draw can generally be at a lower drawing ratio than the first draw. For example, a second, third, fourth etc. draw can be carried out at a draw ratio of less than about 5. In certain embodiments, a second, third, fourth etc. draw can be carried out at a draw ratio of less than about 3.

Optionally, the drawn filament(s) can be heat set. For example, the filament(s) can be relaxed or subjected to a very low draw ratio (e.g. a draw ratio of between about 0.7 and about 1.3) and subjected to a temperature of between about 130° C. and about 150° C. for a short period of time, generally less than 3 minutes, such as less than one minute, or for example, about less than 5 seconds. This optional heat set step can serve to "lock" the crystalline structure of the filament(s) following drawing. In addition, it can reduce heat shrinkage, which may be desired in some embodiments.

In other embodiments, the drawn filament(s) can be surface treated to improve certain characteristics, such as wettability or adhesion. For instance, the filament(s) can be fibrillated, subjected to plasma or corona treatments, or can include an added surface fiber sizing, all of which are methods generally known in the art. Typically, such methods aid in improving the dispersibility of the fibers in a hydrated medium, such as for example a cementitious matrix, and/or in improving the interaction between the fiber interface and one or more ingredients present in a hydrated medium, such as for example a cementitious matrix.

In certain particular embodiments, the drawn filament(s) are wound on a take-up roll.

In other embodiments, however, the drawn mono- or multifilaments can be further processed to form the (staple) fibers of the present invention, e.g. by cutting, tearing or breaking the filaments into fibers of a certain length. The staple fibers can be cut, torn, broken or formed from the mono- or multifilaments according to any process generally known in the art including, for example, by use of metal blades, rotary knives, and the like.

In general, the finished fiber(s) are packed in bags or pressed in bales and transported to a second location for formation of a secondary product. Alternatively, the finished fiber(s) can be fed to a second processing line, for further processing to form a secondary product, such as but not limited to a fiber cement product.

Using the production process of the present invention, the present inventors have succeeded in producing drawn polypropylene filaments and fibers, having a unique and favourable combination of physical characteristics, which make these fibers suitable for use in products demanding a high impact resistance, such as for example fiber cement products. More specifically, the present invention provides filament(s) and fiber(s) having a high density, a high tenacity and a high stretchability, which makes them extremely well adapted for use in materials that are typically required to be resistant against heavy impacts, such as fiber cement products.

Thus, in a second aspect, the present invention provides polypropylene filament(s) and fiber(s) as obtainable according to the processes of the invention.

More specifically, the polypropylene monofilament(s) and fiber(s) derived therefrom according to the present invention generally have a drawn linear density of between about 1 dtex (per filament) and about 75 dtex (per filament). In particular embodiments, the monofilament(s) and fiber(s) derived therefrom according to the present invention have a drawn linear density between about 1 dtex (per filament) and about 50 dtex (per filament). In further particular embodiments, the monofilament(s) and fiber(s) derived therefrom according to the present invention have a drawn linear density between about 1 dtex (per filament) and about 30 dtex (per filament). In yet further particular embodiments, the monofilament(s) and fiber(s) of the present invention have a drawn density between about 10 dtex (per filament) and about 25 dtex (per filament).

Furthermore, the polypropylene multifilament(s) and fiber(s) derived therefrom according to the present invention generally have a drawn linear density of between about 1 dtex (per filament) and about 75 dtex (per filament), such as between about 1 dtex (per filament) and about 50 dtex (per filament), such as in particular between about 1 dtex (per filament) and about 30 dtex (per filament). In particular embodiments, the multifilament(s) and fiber(s) derived therefrom according to the present invention have a drawn linear density between about 1 dtex (per filament) and about 25 dtex (per filament). In further particular embodiments, the multifilament(s) and fiber(s) derived therefrom according to the present invention have a drawn linear density between about 1 dtex (per filament) and about 20 dtex (per filament). In yet further particular embodiments, the multifilament(s) and fiber(s) of the present invention have a drawn density between about 5 dtex (per filament) and about 20 dtex (per filament).

In particular embodiments of the invention, filaments and fibers with a decreased linear density, an increased tenacity and an increased matrix interface interaction are preferred for use in the production of fiber cement products and fiber concrete products as envisaged herein.

In addition, the monofilament(s), multifilaments and fiber(s) derived therefrom according to the present invention have a high tenacity, which ranges between about 7 and 15 cN/dtex or more as measured using a "Favimat" testing machine from the company Textechno.

Indeed, the mechanical characterizations of the filaments were tested by FAVIMAT equipment (Textechno) at 20° C., using a gauge length of 50 mm. Force-versus-elongation curves were done at a cross-head speed of 10 followed by 50 mm/min to determine the linear density and then the other tensile properties (modulus, tensile strength, and percent elongation to break).

In particular embodiments, the filament(s) and fiber(s) of the present invention have a tenacity of between about 7 cN/dtex and about 15 cN/dtex, such as between about 8 cN/dtex and about 15 cN/dtex, more particularly between about 9 cN/dtex and about 15 cN/dtex, most particularly between about 10 cN/dtex and 15 cN/dtex. Thus, in particular embodiments, the filament(s) and fiber(s) of the present invention have a tenacity of about 10 cN/dtex or more, such as about 11 cN/dtex or more, including about 12 cN/dtex or more, particularly between 13 cN/dtex or more, more particularly about 14 dtex or more, most particularly about 15, about 16, about 17, about 18, about 19 or about 20 dtex/cN or more.

In addition, the filaments and fibers of the present invention have a high modulus, in general greater than about 50 cN/dtex. In particular embodiments, the filaments and fibers of the present invention exhibit a modulus greater than about 60 cN/dtex, such as more particularly greater than about 80 cN/dtex, such as most particularly greater than about 100 cN/dtex, such as greater than about 150 cN/dtex, most particularly greater than about 160 cN/dtex. In certain particular embodiments, the filaments and fibers of the present invention exhibit a modulus between about 100 cN/dtex and about 150 cN/dtex.

In addition, the drawn filaments and fibers of the present invention also exhibit specific elongation characteristics.

The mechanical characterizations of the filaments were tested by FAVIMAT equipment (Textechno) at 20° C., using a gauge length of 50 mm. Force-versus-elongation curves were done at a cross-head speed of 10 followed by 50 mm/min to determine the linear density and then the other tensile properties (modulus, tensile strength, and percent elongation to break).

For example, the filaments and fibers of the present invention exhibit an elongation (at breakage) percentage of between about 1% and about 50%, such as between about 5% and about 50%. In further particular embodiments, the filaments and fibers of the present invention exhibit an elongation (at breakage) percentage of between about 5% and about 40%, such as between about 5% and about 30%. In certain further embodiments, the filaments and fibers of the present invention exhibit an elongation (at breakage) percentage of between about 10% and about 30%, such as between about 10% and about 25%, such as more particularly between about 10% and about 20%.

The inventive filaments and fibers of the present invention are also believed to possess a unique crystalline structure as compared to other, previously known polypropylene filaments. There are several widely accepted means by which to measure molecular orientation in oriented polymer systems, among them scattering of light or X-rays, absorbance measurements, mechanical property analysis, and the like. Quantitative methods include wide angle X-ray scattering (WAXS), small angle X-ray scattering (SAXS) and differential scanning calorimetry (DSC).

Through the utilization of WAXS techniques, the disclosed filaments and fibers are shown to be medium crystalline, allowing sufficiently high flexibility as well as sufficiently high tensile strength, which are characteristics that are both needed for the applications of these filaments and fibers in fiber cement products as further disclosed herein. In particular, the filaments and fibers possess between about 40% and about 60% crystallinity, such as between about 40% and about 55% crystallinity, such as between about 45% and about 50% crystallinity as determined using WAXS and DSC measuring techniques, as generally known to the person skilled in the art. The above-mentioned crystallinity degrees further allow the filaments and fibers of the present invention to be particularly suitable for fiber cement applications, in particular the production of fiber reinforced cement products and for the reinforcement of fiber cement materials.

The filament(s) and/or fibers of the present invention are polypropylene-based materials. In certain embodiments, described in more detail below, the filament(s) and/or fibers of the invention can be formed with one or more polypropylene homopolymers and/or copolymers as the only polymeric component of the filament(s) and/or fibers. However, in alternative embodiments, filament(s) and/or fiber(s) of the present invention can be formed with polypropylene blends, for example polypropylene/polyethylene blends.

In particular embodiments, the polypropylene filaments and fibers of the present invention are made using resins of high isotacticity degree (e.g. but not limited to at least 90% isotacticity degree, such as at least 94% isotacticity degree, such as about 95% isotacticity degree).

In general, the disclosed filaments and fibers can be utilized to add strength to a composite structural material. According to these embodiments, the fibers, when incorporated into the composite, can strengthen and reinforce the structural matrix of the composite.

In particular, it was found that when using the fibers obtainable by the methods according to the present invention as raw material in the production of fiber cement, fiber cement products with a significantly improved impact resistance are obtained. The present invention is therefore also directed to methods for using the filament(s) and/or fibers of the present invention into fiber cement products or materials.

Accordingly, in a third aspect, the present invention provides for the use of the drawn polypropylene filaments or drawn polypropylene fibers as disclosed herein for the production of a fiber cement product.

Thus, according to certain embodiments of the present invention, the disclosed filaments and fibers can be beneficially utilized as reinforcement material in fiber cement materials.

Alternatively, in other embodiments, following the production process as described herein, the filaments and fibers can be further processed prior to use as a reinforcement material in a fiber cement product. For instance, prior to use as a reinforcement material in fiber cement products, the fibers of the present invention can be chopped, fibrillated, flattened, bent, or otherwise deformed as is generally known in the art.

Following any of such desired post-formation processes, the fibers can be combined with concrete or with a cementitious material to form a raw fiber cement material for forming a fiber cement product that can exhibit improved strength characteristics as compared to the fiber cement product that does not include the fibers of the invention.

Indeed, it is a further object of the present invention to provide fiber cement products having a satisfactory flexural resistance combined with an excellent impact resistance, even after ageing. Therefore, the fiber cement products according to the invention are characterized in that these are manufactured starting from the polypropylene fibers according to the present invention.

Accordingly, in one embodiment, the present invention is directed to fiber cement products including the fibers of the present invention. In this respect, the fibers of the invention serve to reinforce the strength characteristics of the cured fiber cement material. In particular, the fibers of the present invention function improve both the strength (the ability of the cured matrix to resist crack initiation) as well as the fracture toughness (the ability of the structure to resist propagation of an existing crack in the structure) of the fiber cement materials and products containing these fibers.

In particular embodiments, the fiber cement products of the present invention can include a multitude of relatively short lengths of fibers distributed throughout the fiber cement matrix. For instance, the fiber cement products of the present invention can include a multitude of monofilament fibers and/or multifilament fibers as defined herein that have been cut or chopped to a length of between about 3 mm and about 50 mm, such as between about 3 and about 25 mm. In certain particular embodiments, the fibers can have a discrete length of less than about 20 mm, more particularly less than about 15 mm, such as most particularly about 12 mm.

In certain embodiments, the fibers of the present invention can be combined with other reinforcement fibers in the production of the fiber cement materials of the present invention. For instance, a certain amount of the fibers of the invention together with a certain amount of one or more of any other type of reinforcement fiber known in the art can be incorporated in the fiber cement products of the invention.

A non-limiting list of other types of reinforcement fibers can include, for example, steel fibers, carbon fibers, Kevlar® (poly-paraphenylene terephthalamide) fibers, ultra-high molecular weight polyethylene fibers, liquid crystal fibers, polyvinyl alcohol fibers, glass fibers, polypropylene fibers of different linear density and/or tenacity, cellulose fibers, such as kraft pulps, etc.

Suitable matrix material to be combined with the fibers of the present invention in the production of fiber cement products can generally be any raw matrix materials commonly used in the production of fiber cement products.

Thus, in a fourth aspect, the present invention provides processes for the production of fiber cement products, at least comprising the step of manufacturing a fiber cement product starting from a drawn polypropylene filament or a drawn polypropylene fiber of the invention.

Typically, in the processes for producing fiber cement products of the present invention, the various starting component materials are be mixed, cured and/or otherwise processed according to any standard method generally known in the art.

In the context of the present invention, fiber cement products are to be understood as cementitious products comprising cement and synthetic (and optionally natural) fibers. The fiber cement products are made out of fiber cement slurry, which is formed in a so-called "green" fiber cement product, and then cured.

Dependent to some extent on the curing process used, the fiber cement slurry typically comprises water, process or reinforcing fibers which are synthetic organic fibers (and optionally also natural organic fibers, such as cellulose), cement (e.g. Portland cement), limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, anti-foaming agents, flocculants, and/or other additives. Optionally a color additive (e.g. pigments) are added, to obtain a fiber cement product which is so-called colored in the mass.

Fiber cement products, such as fiber cement plates or fiber cement sheets or fiber cement panels usually are made using the well-known Hatschek-process, flow-on process or Magnani-process or combinations thereof.

According to some embodiments of the invention, the uncured fiber cement product may be obtained using a Hatschek process.

After production, fiber cement products can be allowed to cure over a time in the environment in which they are formed, or alternatively can be subjected to a thermal cure (e.g. by autoclaving or the like).

In particular embodiments, the "green" fiber cement product, after being made by the Hatschek-process (or flow-on process or Magnani-process or combinations thereof), is cured, typically by curing to the air (air cured fiber cement products) or under pressure in presence of steam and increased temperature (autoclave cured). For autoclave cured products, typically sand is added to the original fiber cement slurry. The autoclave curing in principle results in the presence of 11.3 Å (angstrom) Tobermorite in the fiber cement product.

In further particular embodiments, the "green" fiber cement product, after being made by the Hatschek-process (or flow-on process or Magnani-process or combinations thereof), may be first pre-cured to the air, after which the pre-cured product is further air-cured until it has its final strength, or autoclave-cured using pressure and steam, to give the product its final properties.

After curing, the fiber cement product being a panel, sheet or plate, may still comprise a significant weight of water, present as humidity. This may be up to 10 even 15% w, expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

In a fifth aspect, the present invention provides a fiber cement products obtainable by such processes.

Fiber cement products as referred to herein include roof or wall covering products made out of fiber cement, such as fiber cement tiles, fiber cement slates, fiber cement sidings, fiber cement boards, flat fiber cement sheets, corrugated fiber cement sheets and the like.

According to particular embodiments, the fiber cement products according to the invention can be roofing or façade elements, flat sheets or corrugated sheets. In certain particular embodiments, the polypropylene fibers of the present invention are particularly suited for the manufacture of corrugated fiber cement sheets.

According to other particular embodiments, the fiber cement products of the present invention have the shape of a pipe, a tank storage element or any other fiber cement object of any other shape.

According to further particular embodiments, the fiber cement products of the present invention are fiber cement sheets, in particular corrugated fiber cement sheets.

A sheet as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

According to some embodiments of the invention, the fiber cement product may be an air cured fiber cement product, such as an air cured flat sheet or an air cured corrugated sheet.

The fiber cement products of the present invention exhibit improved structural characteristics as compared to previously known fiber cement products utilizing reinforcement materials, other than the fibers of the present invention.

Without being bound to a specific theory, the improved reinforcement characteristics exhibited by the fiber cement products are believed to be due mainly to the improved mechanical characteristics of the individual fibers, i.e. density, tenacity, elasticity, modulus etc. but also to the fact that these mechanical characteristics lead to an optimal entanglement between the fibers and thus improved strength and impact resistance of the fiber cement material in which these fibers are incorporated. In addition, the fibers of the present invention also possess an optimal entanglement within cured fiber cement products, and thus these products can also exhibit improved fracture toughness as compared to fiber cement materials including previously known fiber reinforcement materials.

The fiber cement products of the present invention comprise from about 0.1 to about 5 weight %, such as particularly from about 0.5 to about 4 weight % of fibers, such as more particularly between about 1 to 3 weight % of fibers with respect to the total weight of the fiber cement product.

According to a particular embodiment, the fiber cement product according to the invention is characterized in that it comprises, besides the polypropylene fibers of the invention, other reinforcing fibers, such as cellulose fibers or other inorganic or organic reinforcing fibers in a weight % of about 0.1 to about 5. In particular embodiments, organic fibers are selected from the group consisting of polyvinyl-alcohol polyacrylonitrile fibers, polyethylene, cellulose fibres (such as wood or annual kraft pulps), polyamide fibers, polyester fibers, aramide fibers and carbon fibers. In further particular embodiments, inorganic fibers are selected from the group consisting of glass fibers, rockwool fibers, slag wool fibers, wollastonite fibers, ceramic fibers and the like. In further particular embodiments, the fiber cement products of the present invention may comprise fibrils fibrids, such as for example but not limited to, polyolefinic fibrils fibrids % in a weight % of about 0.1 to 3, such as "synthetic wood pulp".

According to certain particular embodiments, the fiber cement products of the present invention comprise 20 to 95 weight % cement as hydraulic binder. Cement in the products of the invention is selected from the group consisting of Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

According to particular embodiments, the fiber cement products according to the invention optionally comprise further components. These further components in the fiber cement products of the present invention may be selected from the group consisting of fly-ashes, amorphous silica, ground quartz, the ground rock, clays, pigments, metakaolin, blast furnace slag, carbonates, puzzolanas, aluminium hydroxide, wollastonite, mica, perlite, calcium carbonate, etc. The total quantity of such further components is preferably lower than 70 weight % compared to the total initial dry weight of the composition.

Further additives that may be present in the fiber cement products of the present invention may be selected from the group consisting of dispersants, plasticizers, antifoam agents and flocculants. The total quantity of additives is preferably between about 0.1 and about 1 weight % compared to the total initial dry weight of the composition.

Further components that may be present in the fiber cement products of the present invention may be selected from the group consisting of water, sand, silica sand flour, condensed silica fume, microsilica, kaolin, metakaolin, wollastonite, mica, perlite, vermiculite, aluminum hydroxide (ATH), pigments, anti-foaming agents, flocculants, and/or other additives (e.g. colouring additives), each of which are present in suitable amounts depending on the type of the specific fiber cement product and each of which can be determined by the person skilled in the art.

In further particular embodiments, the fiber cement products according to the present invention are fiber concrete products, which further comprises at least one selected from the group consisting of gravel, sand, stone-dust and broken stones.

The fiber cement products of the invention are characterized by a high Charpy impact resistance (measured according to standard ISO180 or ASTM D256) even after ageing during exposure to carbon dioxide. In addition, the products according to the present invention have a high flexural modulus.

Accordingly, the fiber cement products of the present invention exhibit an improved Charpy impact resistance of between about 4 kJ/m$^2$ to about 7 kJ/m$^2$, such as between about 5 kJ/m$^2$ to about 6 kJ/m$^2$ (as measured with the well known Charpy impact test on air dry samples), as compared to previously known fiber cement materials including similar or even longer reinforcement fibers at the same or even greater fiber loading values.

Furthermore, even after ageing (which can be experimentally simulated through extensive $CO_2$ treatment), the fiber cement products of the present invention exhibit an improved Charpy impact resistance of between about 3 kJ/m$^2$ to about 6 kJ/m$^2$, such as between about 4 kJ/m$^2$ to about 5 kJ/m$^2$ (as demonstrated with the well known Charpy impact test), as compared to previously known fiber cement materials after ageing including similar or even longer reinforcement fibers at the same or even greater fiber loading values.

The invention will now be further illustrated in detail with reference to the following Examples.

It is to be understood that although preferred embodiments and/or materials have been discussed for providing embodiments according to the present invention, various modifications or changes may be made without departing from the scope and spirit of this invention.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Example 1: Effect of Liquid Quenching at Low Temperatures on the Mechanical Properties of Polypropylene Fibers Isotactic polypropylene fibers having a molecular weight (Mw) of about 400.000 g/moles were studied.

1.1 Methods and Materials 1.1.1 Production of Polypropylene Fibers According to the Process of the Invention Melt spinning of polypropylene was performed (as generally known in the art) with an extrusion temperatures between about 230° C. and about 270° C. and die zone temperatures of on average about 250° C.

Multifilaments were prepared by extruding the polypropylene through a spinneret with hydraulic pressure applied from metering pumps. After spinning, the extruded filaments were quenched in a water bath at different temperatures between about 20° C. and 45° C. After quenching, the filaments were taken up by a variable speed godet at a speed between about 4 and about 10 m/min and were drawn at a temperature of about 150° C. and wound onto a tube using a winder.

A spinning plate having holes of 0.3 mm diameter and an L/D of 4 was used.

1.1.2 Characterization of Polypropylene Fibers Produced According to the Process of the Invention The mechanical properties of the fibers (i.e. modulus, tensile strength, and elongation at break) of 11 samples were measured using Favimat test machine (automatic linear density and tensile tester for single fibers; company: Textechno) at 20° C. with a load cell of 200 cN capacity (see Table 2).

1.2 Results

Table 1 shows the relationship between the fiber properties (linear density, tenacity and modulus) and the temperature of the liquid bath used during the quenching step of the production process. The results in Table 2 represent average values from several sample tests.

With the process as described above, polypropylene fibers with a linear density of between about 4 dtex (per filament) and about 30 dtex (per filament) were obtained. Moreover, it was observed that the tenacity of the fibers was higher in the case of liquid quenching with water at 20° C. as opposed to air quenching at 20° C.

In addition, the present inventors have found that, while the quenching steps known in the art are typically performed at temperatures well above 50° C., surprisingly enough, the tenacity of the fibers increases when performing the production process at low liquid quenching temperatures of between 5° C. and 50° C., more particularly between about 20° C. and 30° C., most particularly around about 20° C. (see Table 1).

TABLE 1

Mechanical properties of fibers obtained according to the invention at different quenching conditions

| Ref. | Type of quenching step | Quenching temperature (° C.) | Linear density (dpf) | Tenacity (cN/dtex) | Elongation at break (%) |
|---|---|---|---|---|---|
| 1 | Air quenching | 20 | 9 | 6.6 | 49 |
| 2 | Water quenching | 21 | 19-25 | 8-8.7 | 39-42 |
| 3 | Water quenching | 30 | 30 | 9 | 12 |
| 4 | Water quenching | 20 | 16 | 9 | 25 |
| 5 | Water quenching | 40 | 16.4 | 7.3 | 17 |
| 6 | Water quenching | 20 | 14 | 10 | 13 |

1.3 Conclusion

In the present experiments, it was shown that liquid quenching at a temperature range between about 20° C. and about 40° C. beneficially contributes to the mechanical performance, and in particular the tenacity, of the fibers as produced according to the present invention.

Example 2: Effect of the Distance Between the Surface of the Liquid Bath Used for Quenching and the Surface of the Spinneret on the Mechanical Properties of Polypropylene Fibers Isotactic polypropylene fibers having a molecular weight (Mw) of about 400.000 g/moles were studied.

2.1 Methods and Materials 2.1.1 Production of Polypropylene Fibers According to the Process of the Invention Melt spinning of polypropylene was performed (as generally known in the art) with an extrusion temperatures between about 230° C. and about 270° C. and die zone temperatures of on average about 250° C.

Multifilaments were prepared by extruding the polypropylene through a spinneret with hydraulic pressure applied from metering pumps. After spinning, the extruded Multifilaments were quenched in a water bath at a temperature of about 40-45° C.

In particular, the effect of the distance between the surface of the liquid bath used for quenching and the surface of the spinneret on the mechanical properties of polypropylene fibers was studied.

In one series of experiments, the distance between the surface of the water bath and the surface of the spinneret was about 5-6 mm, whereas in another series of experiments the distance between the surface of the water bath and the surface of the spinneret was about 100 mm.

After quenching, the filaments were taken up by a variable speed godet at set speed and were drawn at a temperature of about 150° C. and wound onto a tube with a winder.

A spinning plate having holes of 0.3 mm diameter and an L/D of 4 was used.

2.1.2 Characterization of Polypropylene Fibers Produced According to the Process of the Invention For each of the experimental conditions, the mechanical properties of the fibers (i.e. modulus, tensile strength, and elongation at break) of 11 samples were measured using Favimat test machine (automatic linear density, and tensile tester for single fibers; company: Textechno) at 20° C. with a load cell of 200 cN capacity (see Table 2).

2.2 Results

Table 2 shows the relationship between the fiber properties (linear density, tenacity and modulus) and distance between the surface of the liquid bath used for quenching and the surface of the spinneret. The results in Table 2 represent average values from several sample tests.

With the process as described above, polypropylene fibers with a high linear density of between about 9 dtex (per filament) and about 30 dtex (per filament) were obtained. Moreover, it was observed that both the tenacity and the elongation of the fibers was higher if the distance between the surface of the liquid bath and the surface of the spinneret was greater (see Table 2).

TABLE 2

Mechanical properties of fibers obtained according to the invention at different distances between the liquid bath for quenching and the surface of the spinneret

| Ref. | Distance between liquid bath and spinneret (mm) | Quenching temperature (° C.) | Linear density (dpf) | Tenacity (cN/dtex) | Elongation at break (%) |
|---|---|---|---|---|---|
| 5 | 5-6 | 40 | 16.4 | 7.3 | 17 |
| 7 | 100 | 45 | 13.9 | 11.4 | 31 |

2.3 Conclusion

In the present experiments, it was shown that liquid quenching at a temperature range between about 20° C. and about 40° C. beneficially contributes to the mechanical performance, and in particular the tenacity, of the fibers as produced according to the present invention.

Example 3: Impact Resistance of Fiber Cement Products Manufactured Using the Polypropylene Fibers of the Invention The isotactic polypropylene fibers as described in Example 1 above (refs. 1 to 6 in Table 1) were used for the production of fiber cement.

3.1 Methods and Materials 3.1.1 Production of Fiber Cement on Mini-Hatschek Machine Cementitious products were manufactured by the Hatschek technique according to a pilot process reproducing the main characteristics of the products obtained by the industrial process. The polypropylene fibers as described in Example 1 above (refs. 1 to 6 in Table 1) were used as reinforcing material to the raw matrix material.

The fiber cement sheets were hardened during one night at 50° C., and afterwards under plastic cover sheet during 14 days at room temperature.

3.1.2 Measurement of the Charpy Impact Resistance

The Charpy impact resistance was measured according to standard ASTM D-256-81, using an apparatus Zwick DIN 5102.100/00 on air-dry mini-Hatschek samples of 15 mm*120 mm and a span of 100 mm.

Ten mini-Hatschek samples were measured in two directions (machine direction and direction perpendicular to this) two weeks after the production.

The impact resistance of the same samples was again measured after ageing in an oven of 600 L at 60° C. and 90% of relative humidity, with injection of 1,5 l $CO_2$/min during 24 hours. The $CO_2$ concentration ranges thus from 7% at the beginning of conditioning to 12% at the end of conditioning.

3.2 Results

Table 3 shows the results that were obtained with regard to the Charpy impact resistance of fiber cement products manufactured using the polypropylene fibers as listed in Table 1 (Example 1). The results in Table 3 represent average values from several sample tests. It was observed that the Charpy impact resistance of the obtained fiber cement products was higher in the case of liquid quenching with water at 20° C. as opposed to air quenching at 20° C.

In addition, the present inventors have found that, while the liquid quenching steps known in the art are typically performed at temperatures well above 50° C., surprisingly enough, Charpy impact resistance of the obtained fiber cement products appeared to be optimal when performing the production process at low liquid quenching temperatures of between 5° C. and 50° C., more particularly between about 20° C. and 30° C., most particularly around about 20° C. (see Table 3).

Moreover, Table 3 shows that the obtained fiber cement products have an improved impact resistance both immediately after production and when aged (after carbonatation).

TABLE 3

Charpy impact resistance of fiber cement products obtained using polypropylene fibers obtained at different quenching conditions

| Ref. of polypropylene fibers used (see Table 1) | Type of quenching step | Quenching temperature (° C.) | Charpy impact of fiber cement before $CO_2$ (i.e. before ageing) (kJ/m$^2$) | Charpy impact of fiber cement after $CO_2$ (i.e. after ageing) (kJ/m$^2$) |
|---|---|---|---|---|
| 1 | Air quenching | 20 | 4.7 | 3.9 |
| 2 | Water quenching | 21 | 6.3 | 5.2 |
| 3 | Water quenching | 30 | 5.5 | 5.3 |
| 4 | Water quenching | 20 | 5.9 | 5 |
| 5 | Water quenching | 40 | 5.7 | Not determined |
| 6 | Water quenching | 20 | 5.6 | Not determined |

3.3 Conclusion

To conclude, it is clear that fiber cement products manufactured starting from polypropylene fibers according to the present invention showed improved properties with regard to impact resistance.

Example 4: Effect of Molecular Weight on the Tenacity of Polypropylene Fibers Using a Liquid Quenching Step at Room Temperature Three different isotactic polypropylene fibers with different molecular weights (Mw) ranging between 200.000 g/moles and 400.000 g/moles were studied.

4.1 Methods and Materials 4.1.1 Production of Polypropylene Fibers According to the Process of the Invention Melt spinning of polypropylene was performed (as generally known in the art) with an extrusion and die zone temperature of about 230° C.

Fibers were prepared by extruding the polypropylene through a spinneret with hydraulic pressure applied from metering pumps. After spinning, the extruded filaments were quenched in a water bath at room temperature (i.e. about 20° C.). After quenching, the monofilaments were taken up by a variable speed godet at set speed and were drawn at a temperature of about 150° C. and wound onto a tube with a winder.

Two types of spinning plates were used, i.e. a spinning plate having 8 orifices and a diameter of 0.5 mm and a spinning plate with 36 orifices having a diameter of 0.4 mm.

4.1.2 Characterization of Polypropylene Fibers Produced According to the Process of the Invention The mechanical characterizations of the filaments were tested by FAVIMAT equipment (Textechno) at 20° C. with a load cell of 200 cN capacity, using a gauge length of 50 mm. Force-versus-elongation curves were done at a cross-head speed of 10 followed by 50 mm/min to determine the linear density and then the other tensile properties (modulus, tensile strength, and percent elongation to break) (see Table 1).

4.2 Results

The effects of draw ratio and molecular weight on the polypropylene fiber properties at constant liquid quenching temperatures of 20° C. are summarized in Table 4.

In particular, Table 4 shows the relationship between on the one hand the linear density, tenacity and modulus of the fibers and on the other hand the draw ratio for 2 polypropylene fiber types, one with a high and one with a low melt flow index (MEI). The results in Table 4 represent average values from several sample tests.

It can be seen in Table 4 that polypropylene fibers with a high linear density of between about 25 (per filament) and about 37 dtex (per filament) were obtained for both of the polypropylene types having a high and a low melt flow index, respectively.

In addition, Table 1 shows that when comparing ref. 2 (high MEI) to ref. 8 (low MEI), for a given similar linear density, the tenacity obtained by using high molecular weight (and thus a low MEI) is higher than the tenacity obtained in case of low molecular weight polypropylene (i.e. high MEI).

4.3 Conclusion

In summary, the performance of a polypropylene filaments produced according to the processes of the present invention is correlated with the molecular weight of the polypropylene.

material. In addition, reference samples reinforced with commercially available polypropylene fibers (Daiwabo D120-PP) were produced.

The fiber cement sheets were hardened during one night at 50° C., and afterwards under plastic cover sheet during 14 days at room temperature.

5.1.2 Measurement of the Charpy Impact Resistance

The Charpy impact resistance was measured according to standard ASTM D-256-81, using an apparatus Zwick DIN 5102.100/00 on air-dry mini-Hatschek samples of 15 mm*120 mm and a span of 100 mm.

The impact resistance of mini-Hatschek samples was measured in two directions (machine direction and direction perpendicular to this) two weeks after the production.

5.2 Results

Table 5 shows the results that were obtained with regard to the Charpy impact resistance of fiber cement products manufactured using the polypropylene fibers produced in accordance with the invention and a reference fiber cement product manufactured using commercially available poly-

TABLE 4

Mechanical properties of fibers obtained according to the invention at different melt spinning conditions

| PP type | Ref. | Quenching temp. (° C.) | Drawing temp. (° C.) | Draw ratio | Linear density (dpf) | Tenacity (cN/dtex) | Elong. at break (%) | Modulus (N/tex) |
|---|---|---|---|---|---|---|---|---|
| High MFI | 1 | 20 | 130 | 9 | 45 | 5.1 | 15.2 | 7.12 |
| | 2 | 20 | 130 | 9 | 48 | 6.7 | 15.3 | 8.09 |
| | 3 | 20 | 130 | 10 | 40 | 6.9 | 10.3 | 10.89 |
| | 4 | 20 | 130 | 11 | 30 | 9.2 | 10.8 | 14.51 |
| | 5 | 20 | 130 | 9 | 25 | 9.8 | 15.3 | 11.76 |
| | 6 | 20 | 130 | 10 | 30 | 7.5 | 11.3 | 11.43 |
| | 7 | 20 | 130 | 11 | 28 | 7.2 | 10.6 | 11.09 |
| Low MFI | 8 | 20 | 130 | 8 | 47 | 8.5 | 15.2 | 10.20 |
| | 9 | 20 | 130 | 9 | 50 | 10.3 | 15.7 | 12.03 |
| | 10 | 20 | 130 | 10 | 59 | 7.7 | 13.9 | 9.60 |
| | 11 | 20 | 140 | 9 | 64 | 7.8 | 15.9 | 8.96 |
| | 12 | 20 | 140 | 11 | 45 | 8.9 | 10.6 | 12.88 |
| | 13 | 20 | 160 | 9 | 48 | 10.3 | 16.9 | 10.36 |
| | 14 | 20 | 160 | 11 | 45 | 8.9 | 11.4 | 12.63 |
| | 15 | 20 | 160 | 12 | 48 | 7.7 | 10.5 | 11.95 |
| | 16 | 20 | 160 | 13 | 44 | 7.4 | 8.0 | 13.34 |
| | 17 | 20 | 180 | 9 | 62 | 6.6 | 19.5 | 4.96 |
| | 18 | 20 | 180 | 11 | 52 | 6.6 | 10.5 | 9.36 |
| | 19 | 20 | 180 | 12 | 36 | 10.1 | 10.4 | 16.40 |
| | 20 | 20 | 180 | 13 | 46 | 2.3 | 23.2 | 3.11 |
| | 21 | 20 | 180 | 13 | 37 | 7.9 | 8.3 | 13.89 |

Example 5: Impact Resistance of Fiber Cement Products Manufactured Using the Polypropylene Fibers of the Invention Isotactic polypropylene fibers produced according to the processes of the invention were used for the production of fiber cement corrugated sheets.

5.1 Methods and Materials 5.1.1 Production of Fiber Cement on Mini-Hatschek Machine Cementitious products were manufactured by the Hatschek technique according to a pilot process reproducing the main characteristics of the products obtained by the industrial process. Polypropylene fibers produced in five independent batches according to the process of the invention were used as reinforcing material to the raw matrix propylene fibers (Daiwabo D120-PP). The results in Table 5 represent average values from several sample tests. It was observed that the Charpy impact resistance of the obtained fiber cement products was significantly higher for the fiber cement products comprising the polypropylene fibers produced according to the processes of the invention as compared to the reference fiber cement products comprising commercially available polypropylene fibers (Daiwabo D120-PP).

In addition, the present inventors have found that, while the liquid quenching steps known in the art are typically performed at temperatures well above 50° C., surprisingly enough, Charpy impact resistance of the obtained fiber cement products appeared to be optimal when performing the production process at lower liquid quenching temperatures of between about 35° C. and 40° C. (see Table 5).

TABLE 5

Charpy impact resistance of fiber cement products obtained using polypropylene fibers produced according to the processes of the invention

| Polypropylene fibers used | Type of quenching step | Quenching temperature (° C.) | Distance from liquid surface to spinneret (mm) | Charpy impact of fiber cement before $CO_2$ (i.e. before ageing) (kJ/m$^2$) |
|---|---|---|---|---|
| 7 | Water quenching | 35-40 | 10-15 | 6.76 |
| 8 | Water quenching | 35-40 | 10-15 | 6.22 |
| 9 | Water quenching | 35-40 | 10-15 | 6.43 |
| 10 | Water quenching | 35-40 | 10-15 | 6.36 |
| 11 | Water quenching | 35-40 | 10-15 | 6.34 |
| Reference | Water quenching | 35-40 | 10-15 | 5.83 |

5.3 Conclusion

To conclude, it is clear that fiber cement products manufactured starting from polypropylene fibers according to the present invention showed improved properties with regard to impact resistance as compared to fiber cement products manufactured starting from commercially available polypropylene fibers.

The invention claimed is:

1. A process for the production of at least one drawn polypropylene mono- or multifilament or at least one fiber derived therefrom for the reinforcement of cementitious products, said process comprising the steps of:
   (i) forming a melted polypropylene composition comprising at least one polypropylene,
   (ii) extruding the melted polymeric composition through a spinneret to form a filament of the polymeric composition,
   (iii) quenching the extruded polypropylene filament in a liquid bath having a temperature of between about 5° C. and about 50° C., wherein the distance between the surface of said liquid bath and the surface of said spinneret ranges between about 5 mm and about 200 mm,
   (iv) drawing said filament at a temperature of between about 130° C. and 180° C. to form a drawn polypropylene filament, and
   (v) cutting said filament into one or more fibers,
   wherein said one or more fiber(s) has a crystallinity between about 40% and about 60% as determined using WAXS and DSC measuring techniques.

2. The process according to claim 1, wherein said process is performed in the absence of a nucleating agent.

3. The process according to claim 1, wherein the resident time of said extruded polypropylene filament in said liquid bath is between about 1 second and about 5 seconds.

4. The process according to claim 1, wherein said liquid bath has a temperature between about 30° C. and about 50° C.

5. The process according to claim 1, wherein said distance between the surface of the liquid bath and the surface of the spinneret ranges between about 5 mm and about 160 mm.

6. The process according to claim 1, wherein after step (ii) of extruding and prior to step (iii) of quenching, the melted polymeric composition is kept at a temperature ranging between about 150° C. and 200° C.

7. The drawn polypropylene mono- or multifilament or fiber(s) derived therefrom, obtained by the process as defined in claim 1, wherein said drawn polypropylene mono- or multifilament or fiber(s) derived therefrom have a crystallinity between about 45% and about 50% as determined using WAXS and DSC measuring techniques.

8. The drawn polypropylene mono- or multifilament or fiber(s) derived therefrom according to claim 7, having a linear density of between about 5 dtex per filament and about 25 dtex per filament and a tenacity of between about 7 and about 20 cN/dtex.

9. The drawn polypropylene mono- or multifilament or fiber(s) derived therefrom, obtained by the process as defined in claim 1, having a tenacity of between about 7 cN/dtex and about 20 cN/dtex.

10. The drawn polypropylene mono- or multifilament or fiber(s) derived therefrom according to claim 9, having a linear density of between about 5 dtex per filament and about 25 dtex per filament and a tenacity of between about 7 and about 20 cN/dtex.

11. The drawn polypropylene mono- or multifilament or fiber(s) derived therefrom, obtained by the process as defined in claim 1, having a linear density of between about 5 dtex per filament and about 25 dtex per filament and a tenacity of between about 7 and about 20 cN/dtex.

12. The drawn polypropylene mono- or multifilament or fiber(s) derived therefrom, obtained by the process as defined in claim 1, having an elongation at breakage of between about 5% and 40%.

13. The drawn polypropylene mono- or multifilament or fiber(s) derived therefrom, obtained by the process as defined in claim 1, having an elongation at breakage of between about 10% and about 25%.

14. The process according to claim 1, wherein step (iii) is performed by quenching the extruded polypropylene filament in a liquid bath having a temperature of between about 20° C. and about 50° C.

15. The process according to claim 14, wherein step (iii) is performed by quenching the extruded polypropylene filament in a liquid bath having a temperature of between about 20° C. and about 40° C.

16. A method for the production of a fiber reinforced cement product and/or for the reinforcement of a cementitious material, comprising using a drawn polypropylene mono- or multifilament or fiber(s) derived therefrom having a crystallinity between about 40% and about 60% as determined using WAXS and DSC measuring techniques, and obtained by a process comprising the steps of:
   (i) forming a melted polypropylene composition comprising at least one polypropylene,
   (ii) extruding the melted polymeric composition through a spinneret to form a filament of the polymeric composition,
   (iii) quenching the extruded polypropylene filament in a liquid bath having a temperature of between about 5° C. and about 50° C., wherein the distance between the surface of said liquid bath and the surface of said spinneret ranges between about 5 mm and about 200 mm, and
   (iv) drawing said filament at a temperature of between about 130° C. and 180° C. to form a drawn polypropylene filament, and optionally
   (v) cutting said filament into one or more fibers having a length between about 3 and about 50 mm.

17. A process for the production of a fiber reinforced cement product, comprising the step of manufacturing a fiber reinforced cement product starting from fiber material derived from a drawn polypropylene mono- or multifilament or fiber(s) derived therefrom having a crystallinity between about 40% and about 60% as determined using WAXS and DSC measuring techniques, and obtained by a process comprising the steps of:
- (i) forming a melted polypropylene composition comprising at least one polypropylene,
- (ii) extruding the melted polymeric composition through a spinneret to form a filament of the polymeric composition,
- (iii) quenching the extruded polypropylene filament in a liquid bath having a temperature of between about 5° C. and about 50° C., wherein the distance between the surface of said liquid bath and the surface of said spinneret ranges between about 5 mm and about 200 mm, and
- (iv) drawing said filament at a temperature of between about 130° C. and 180° C. to form a drawn polypropylene filament, and optionally
- (v) cutting said filament into one or more fibers having a length between about 3 and about 50 mm.

18. Fiber reinforced cement product obtained by the process according to claim 17.

19. A drawn polypropylene mono- or multifilament or fiber(s) derived therefrom, having a tenacity of between about 7 cN/dtex and about 20 cN/dtex and a crystallinity between about 45% and about 50% as determined using WAXS and DSC measuring techniques, and obtained by a process comprising the steps of:
- (i) forming a melted polypropylene composition comprising at least one polypropylene,
- (ii) extruding the melted polymeric composition through a spinneret to form a filament of the polymeric composition,
- (iii) quenching the extruded polypropylene filament in a liquid bath having a temperature of between about 5° C. and about 50° C., wherein the distance between the surface of said liquid bath and the surface of said spinneret ranges between about 5 mm and about 200 mm, and
- (iv) drawing said filament at a temperature of between about 130° C. and 180° C. to form a drawn polypropylene filament, and
- (v) cutting said filament into one or more fibers having a length between about 3 and about 50 mm.

20. The drawn polypropylene mono- or multifilament or fiber(s) derived therefrom according to claim 19, having a linear density of between about 5 dtex per filament and about 25 dtex per filament and a tenacity of between about 7 and about 20 cN/dtex.

21. The drawn polypropylene mono- or multifilament or fiber(s) derived therefrom according to claim 20, having an elongation at breakage of between about 5% and 40%.

* * * * *